INVENTORS
SAMUEL L. BROADHEAD JR.
JERRY A. MARTIN
HOWARD B. ROOKS
BY
Moody and Kintzinger
ATTORNEYS INVENTORS
SAMUEL L. BROADHEAD JR.
JERRY A. MARTIN
HOWARD B. ROOKS
BY
Moody and Kintzinger
ATTORNEYS INVENTORS
SAMUEL L. BROADHEAD JR.
JERRY A. MARTIN
HOWARD B. ROOKS
BY Moody and Kintzinger
ATTORNEYS

United States Patent Office 3,500,214
Patented Mar. 10, 1970

3,500,214

REFERENCE SIGNAL AND DIGITAL SWITCH-VARIED SIGNAL GENERATOR

Samuel L. Broadhead, Jr., Huntsville, Ala., and Jerry A. Martin, Cedar Rapids, and Howard B. Rooks, Marion, Iowa, assignors to Collins Radio Company, Cedar Rapids, Iowa, a corporation of Iowa Filed Dec. 12, 1966, Ser. No. 601,230
Int. Cl. H03k *21/32, 5/18*
U.S. Cl. 328—48 6 Claims

ABSTRACT OF THE DISCLOSURE

A variable phase signal generator dividing an input signal down to two output signals with a plurality of dividing flip-flop circuits in each signal path, a reference frequency path and a phase varied signal path, and with state outputs of flip-flops in the reference frequency path being switch selected for reset cycling of the phase varied signal path once each operational cycle and desired phase setting of the phase variable output relative to the reference signal output.

Figures 1, 2:
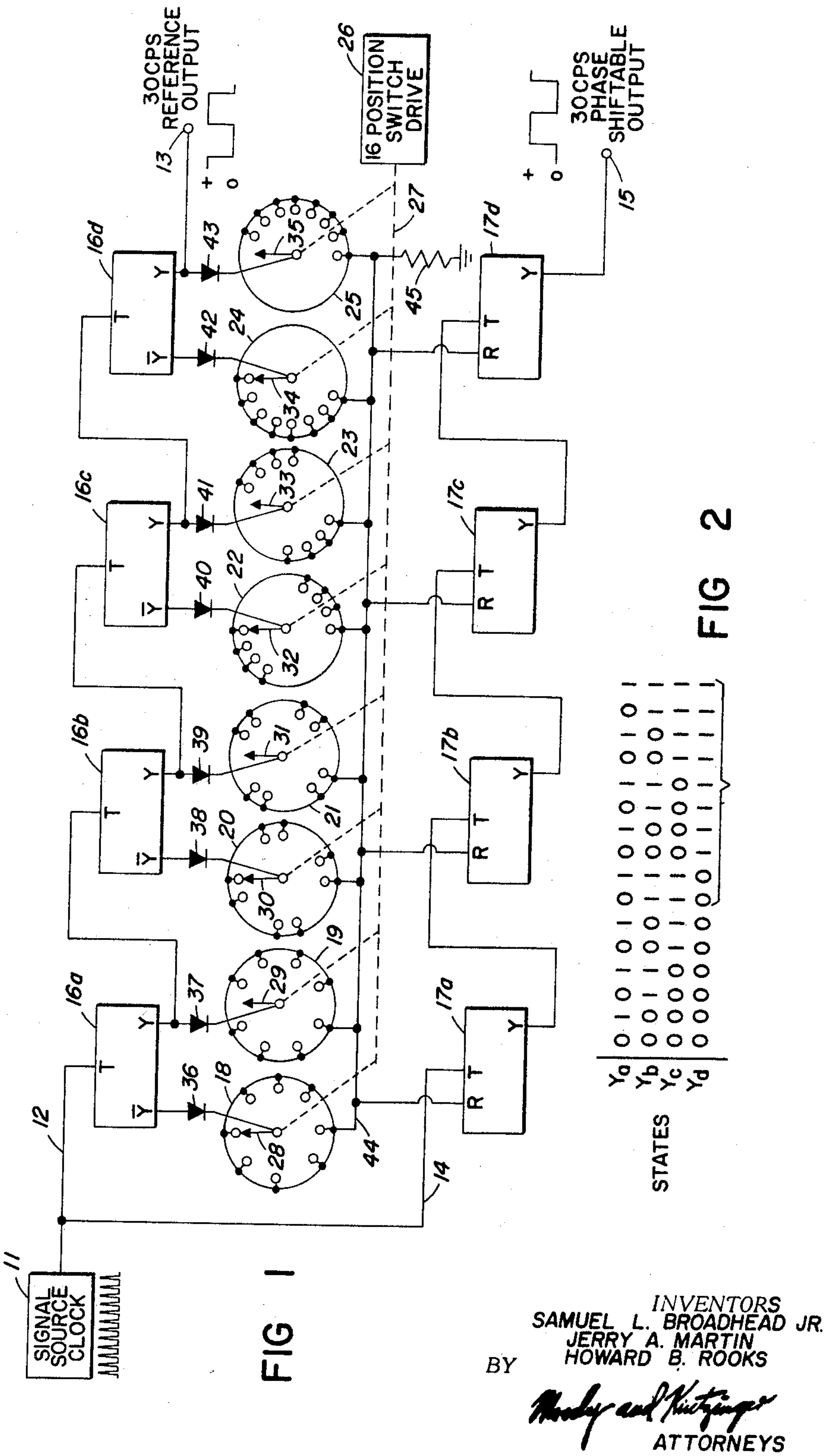

This invention relates in general to variable phase signal generators, and in particular, to a digital variable phase signal generator that divides an input signal down to two equal frequency output signals, one a reference frequency output and the other a digitally phase varied output signal.

Great need has been evidenced for VOR (VHF Omni Range) test equipment capable of simulating the signals emanating from VOR ground stations. To do so such VOR test equipment must be capable of developing a pair of omni range test signals with phase of one output relative to another output variable to a highly predetermined degree of accuracy through 360°.

It is, therefore, a principal object of this invention to provide a variable phase signal generator that divides an input signal down to two equal frequency output signals, one a reference frequency output and the other a phase varied output signal.

A further object is to provide such a variable phase signal generator with the phase varied output signals being digitally phase varied to a very high degree of accuracy.

Features of this invention useful in accomplishing the above objects include, in a digital variable phase signal generator that divides an input signal down to two equal frequency output signals, digital phase varied output signal control in one embodiment down to 0.1° steps through the 360° of operation. This is accomplished in such an embodiment using serially two decade counters and a 36 state counter permiting, respectively, phase selection in 0.1, 1, and 10° steps. Each of the counters (actually divider circuits) has four flip-flops and divides by 16, thus having 16 states with respect to which the two decade counters utilize only ten states. In order to provide the predetermined desired controlled phase relation, one of the states of the counter or divider in one ontput signal developing circuit is selected by switches and diode gates to reset the counter or divider circuitry of the other output circuit to the 0000 state. Thus, this results in a predetermined phase relation for the phase variable output to the other output until such time as switch setting positions are changed, or unless there is an interrupted count.

A specific embodiment representing what is presently regarded as the best mode of carrying out the invention is illustrated in the accompanying drawings.

Figure 3:
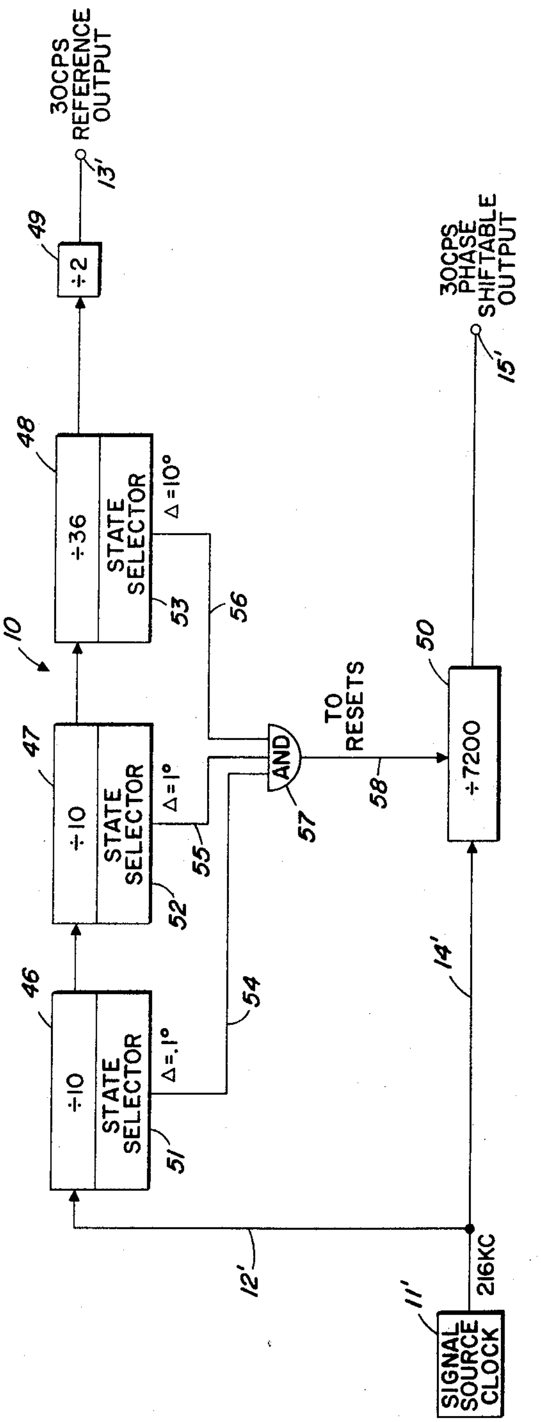
Figure 4:
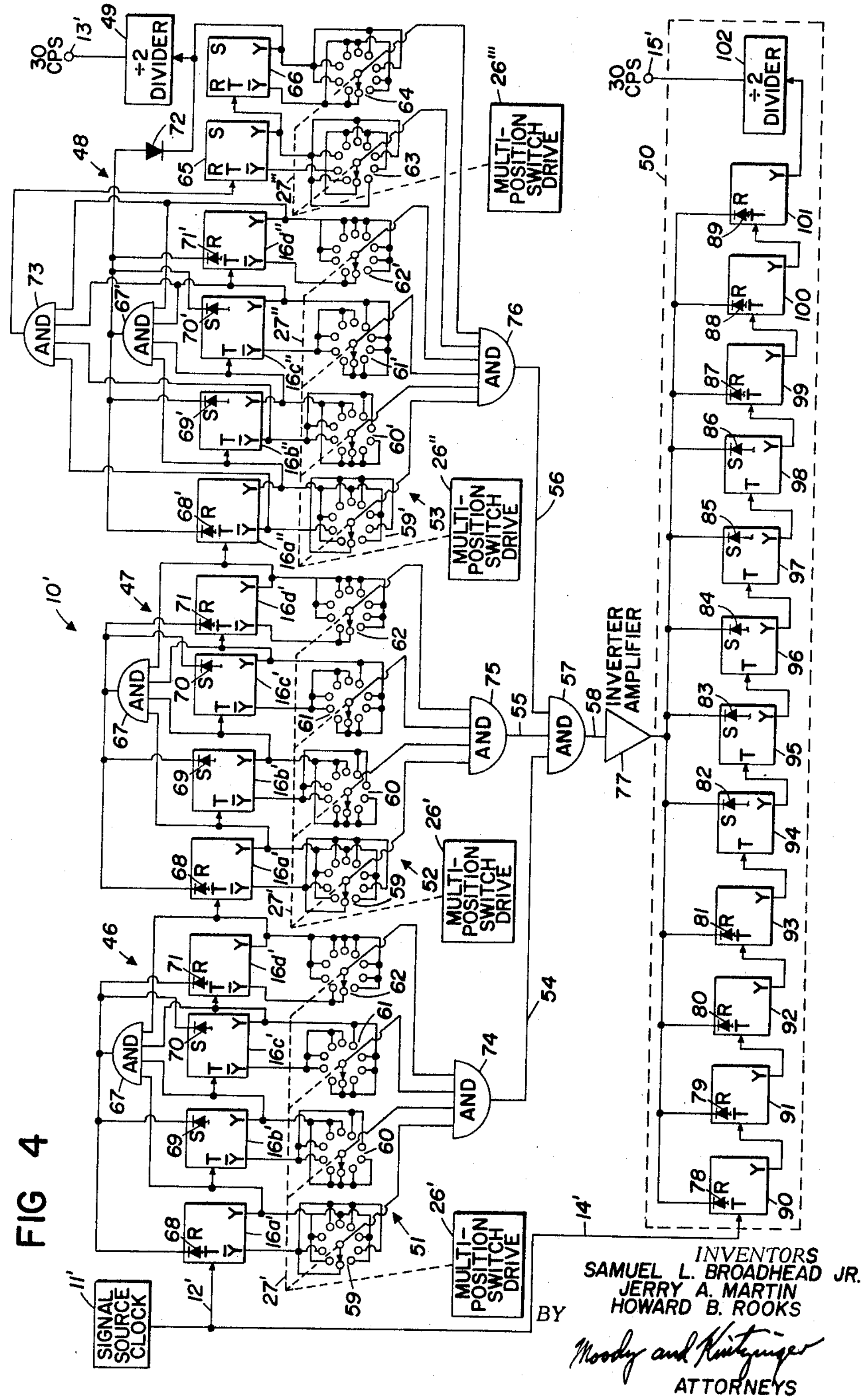

In the drawings:

FIGURE 1 represents a digital variable phase signal generator having 16 states with four flip-flop circuits in each signal path developing, respectively, a reference output signal, and a phase variable signal, and with switches and diode gates interconnecting the two signal circuits paths for resetting and controlling the phase variable output relative to the reference output;

FIGURE 2, a chart of the sixteen states of operation for the Y outputs of the flip-flop circuits 16*a* through 16*d*;

FIGURE 3, a schematic view of a variable phase generator utilizing a 216 kc. clock signal input for developing a 30 cycle per second reference output signal and a 30 cycle per second phase varied output signal, with each signal path providing division by 7200 to develope the respective 30 cycle per second outputs, and with the 30 cycle per second reference signal developing signal path including two 10 state selector circuits and a 36 state selector circuit followed by a dividing by two divider; and FIGURE 4 a more detailed circuit and schematic showing of the embodiment of FIGURE 3.

Referring to the drawings:

The digital variable phase signal generator 10 of FIGURE 1 is shown to receive a reference clock signal input from signal clock source 11. This input signal is divided into a reference signal path 12, terminating in reference signal output terminal 13, and signal path 14, terminating in phase variable output terminal 15. Each of the signal paths 12 and 14 include four flip-flop circuits 16*a* through *d*, and 17*a* through *d*, respectively. The flip-flops 16*a* through 16*d* each include at least an input terminal T and two output terminals $\overline{Y}$ and Y, respectively, and the flip-flops 17*a* through 17*d* each include at least an input terminal T, a reset signal input terminal R, and an output terminal Y. The initial reference input signal from clock signal source 11 is applied as an input to the input terminals T of the flip-flops 16*a* and 17*a* of the signal paths 12 and 14. The Y output terminals of each of the flip-flops is applied as an input to the T input terminal of the next successive flip-flop circuit in each signal path, and two output terminals Y and Y, respectively, and the signal paths 12 and 14 are connected to the output terminals 13 and 15, respectively. A series of wafer switches 18, 19, 20, 21, 22, 23, 24 and 25, or their operational equivalent, are connected to a 16 position switch drive 26 through a common mechanical drive 27. These wafer switches include driven setting contacts 28 through 35, respectively, that are connected with the cathodes of diodes 36 through 43, respectively. The anodes of diodes 36 and 37 are connected to the $\overline{Y}$ and Y output terminals of flip-flop 16*a* and, in like manner, diodes 38 and 39 to the $\overline{Y}$ and Y output terminals of flip-flop 16*b*, diodes 40 and 41 to the corresponding outputs of flip-flop 16*c*, and also the anodes of diodes 42 and 43 to the corresponding outputs of flip-flop 16*d*. All of the other contacts of switches 18 through 25 are connected in common to line 44 and to the reset terminal R of flip-flop circuits 17*a* through 17*d* and also through resistor 45 to ground. It should be noted that a $\overline{Y}$ output for a flip-flop represents a zero output and a Y output represents a one output, and that further, the switch connection contacts for the switch wafers 18 through 25 connected to diodes 36 through 43 and to the flip-flops are so positioned that there are 16 different state settings. The 16 state settings as related to Y outputs *a* through *d* may be seen by reference to FIGURE 2.

Either $\bar{Y}$ or Y state output for the respective flip-flops 16*a* through 16*d* are connected to the respective wafer switches so that there are always four output connections for each reference output signal cycle through the switches 18 through 25 to the reset terminals of the flip-flops 17*a* through 17*d*. These are so set as to come into coincidence as determined by the state settings one time through each 360° cycle to provide phase setting of the variable phase output for each complete cycle. Further, when the four signals are in coincidence as connected to line 44, and with the value of resistor 45 a predetermined value, a threshold reset voltage value is exceeded and reset is triggered in the flip-flops 17*a* through 17*d*. This returns that signal train to the 0000 state, thereby establishing a precise predetermined digitally switch set phase shift for the resulting phase shifted output relative to the reference output. It should be noted that simple manually operated switches may be utilized for switching, for example, switching between diodes 36 and 37 to the line 44 and in like manner alternately between diodes 38 and 39, 40 and 41, and also diodes 42 and 43, respectively, through switches connected to line 44 in place of the wafer switches 18 through 25 and the sixteen position switch drive and drive train 27 shown. Operational results would be substantially the same as described just as would be the case with other switch systems that could be utilized for switching control as accomplished with the switching system shown.

With the digital variable phase signal generator 10′ of FIGURE 3, signal clock source 11′ provides a 216 kc. input signal divided into reference signal path 12′ terminating in reference signal output terminal 13′ and signal path 14′ terminating in phase variable signal output terminal 15′. Reference signal path 12′ includes, successively, two divide by ten circuit sections 46 and 47, a divide by thirty-six section 48, and a divide by two circuit 49, the 30 cycle per second output of which is connected to reference signal output terminal 13′. Signal path 14′ includes a dividing by 7200 circuit 50 with reset circuitry for developing a 30 cycle per second phase shiftable output at output terminal 15′. The divide by ten circuits 46 and 47 in the reference signal path 12′ are shown to include state selector circuit sections 51 and 52, respectively, and the divide by thirty-six state circuit section 48 is shown to include a state selector section 53. These state selectors are capable of providing a phase shift dividing function by, respectively, 0.1°, 1° and 10° intervals, with outputs passed through lines 54, 55 and 56 to an AND gate 57. The output of AND gate 57 when activated by signal coincidence input of all inputs thereto through lines 54, 55 and 56 passes a reset signal through line 58 to the reset circuitry of dividing by 7200 circuit 50.

Referring now to FIGURE 4 for greater detail of a digital phase signal generator 10″ embodiment consistent with the embodiment of FIGURE 3, the divide by ten circuits 46 and 47 in the reference signal path 12′ are similar in many respects to the signal path 12 circuit arrangement in the embodiment of FIGURE 1 with flip-flops 16*a′* through 16*d′* being substantially the equivalent of flip-flops 16*a* through *d* of the FIGURE 1 embodiment. In the embodiment of FIGURE 4, however, the Y and $\bar{Y}$ outputs in the divide by ten circuits 46 and 47 are shown to be connected to four wafer switches 59, 60, 61 and 62 in each of the state selector circuit sections 51 and 52. A separate multiposition switch drive 26′ is connected through a common mechanical drive train 27′ to each of the four switches 59, 60, 61 and 62 for each of the separate state selector circuit sections 51 and 52.

It should be noted, however, that the divide by thirty-six circuit 48 has a state selector circuit section 53 with four switches 59′, 60′, 61′ and 62′ connected through a common drive 27″ to a multiposition switch drive 26″. Section 53 also includes two additional switches 63 and 64 having multicontact portions thereof connected to the $\bar{Y}$ and Y outputs of two additional flip-flops 65 and 66 in the signal path 12′ with a common setting drive 27‴ from a multiposition switch drive 26‴. The four switches 59′, 60′, 61′ and 62′ of section 53 are connected to the $\bar{Y}$ and Y outputs of flip-flops 16*a″* through 16*d″*, respectively, of the divide by thirty-six state circuit section 48.

Referring back again to the divide by ten circuits 46 and 47 in FIGURE 4, in order to make these circuits divide by ten instead of up to a total of sixteen, such as with the embodiment of FIGURE 1, with the four flip-flops 16*a′* through 16*d′* the Y outputs of all four of the flip-flops are connected as inputs to an AND gate 67 developing a negative output, upon coincidence input thereto of all four inputs, that is impressed on the cathodes of diodes 68, 69, 70 and 71 of the respective flip-flop circuits. The connections to these diodes, in the respective circuit sections 46 and 47, is as the reset terminal of flip-flop 16*a′*, the set terminal of flip-flop 16*b′*, the set terminal of flip-flop 16*c′*, and the reset terminal of flip-flop 16*d′*, respectively. This effectively recycles each of these divide by ten circuits back from the last state as shown in the chart of FIGURE 2 to repeatedly run through the last ten states from the seventh state as shown and indicated by the bracket in FIGURE 2.

Referring now to the divide by thirty-six circuit section 48, this section with six series connected flip-flops 16*a″* through 16*d″*, 65, and 66 included in the circuit path 12′ would, without appropriate operational altering circuitry, normally run through sixty-four states and give division by a factor of sixty-four. This, however, is altered by connection of the Y outputs of flip-flop circuits 16*a″* through 16*d″* as inputs to AND circuit 67′, the output of which is impressed simultaneously upon reset and set diodes 68′, 69′, 70′ and 71′ of the flip-flop circuits of 16*a″* through 16*d″* in much the same manner that it is accomplished with the corresponding components in the divide by ten circuits 46 and 47. There are further refinements, however, with this circuit. The Y output of flip-flop 66 which is applied as an input to the final divide by two circuit 49 is also connected to the cathode of diode 72 and through this diode to the same signal line connection from the output of AND circuit 67′ and acts as a further resetting signal for the first four flip-flops 16*a″* through 16*d″* of the divide by thirty-six circuit section 48 in the same manner with activation by the output of AND gate 67′.

A further refinement of circuit section 48 is that the $\bar{Y}$ output terminals of flip-flop circuits 16*a″* and 16*b″* are connected as inputs to AND circuit 73 along with two additional inputs thereto from the Y terminals of flip-flops 16*c″* and 16*d″*. Upon activating coincident input of these four inputs to the AND circuit 73, the output thereof is passed as the signal train input to flip-flop circuit 65 in the signal circuit path 12′ in the circuit section 48 so that in combination the action of the two AND gates 67′ and 73 and the output of flip-flop circuit 66 activating action through diode 72 acts to recycle circuit section 48 repeatedly through thirty-six states to give a divide by thirty-six function, as opposed to a possible sixty-four state function, of the six flip-flops 16*a″* through 16*d″*, 65 and 66 in the circuit section 48. Whereas, four flip-flop sections such as divide by ten circuit sections 46 and 47 and the four flip-flop section in circuit path 12 of the FIGURE 1 embodiment have a four-column sixteen state scope of possible state variations in dividing action, restricted of course by recycling to ten recycle states in the divide by ten sections. The circuit section 48 with its six flip-flops has a potential for a sixcolumn sixty-four possible state range of operations with, however, the circuit modifications providing continual recycle through only thirty-six out of the possible sixty-four states of operation.

With continued attention to FIGURE 4 and cross reference to the showing of FIGURE 3, AND gates 74, 75 and 76 are included as integral parts of the state selectors 51, 52 and 53, respectively. Each of these AND gates 74, 75 and 76 are activated to provide an output signal upon simultaneous voltage signals being impressed thereto through all the inputs from the respective switches in the respective state selectors. Upon each of the outputs of the respective AND gates 74, 75 and 76, through leads 54, 55 and 56, respectively, simultaneously impressing a signal upon AND gate 57 a resulting output is provided on line 58. This line 58 signal is passed through inverter amplifier 77 thereby developing a negative signal impressed on the cathodes of diodes 78 through 89, in the reset or set circuit inputs, as the case may be, of flip-flops 90 through 101, respectively, to effectuate reset of the divide 7200 circuit 50 through repeated cycles of operation as determined by the selected settings of the switches in the state selector sections 51, 52 and 53. The Y output of the flip-flop 101 is passed as an input to the divide by two circuit 102 that may also be a standard flip-flop from which the output is passed to terminal 15'.

It should be noted that while the embodiment of FIGURES 3 and 4 provide for division by 0.1, 1 and 10° steps, particularly useful for simulating signals emanating from a VOR ground station for VOR test equipment, other than such discrete steps may be provided as would be the case if the flip-flops through various sections employed were used directly without the recycling to convert a four flip-flop section from a sixteen state circuit to a divide by ten circuit or taking the six flip-flop circuit 48 and converting it from potentially a sixty-four state circuit to a divide by thirty-six state circuit. Further, various combinations of additional dividing circuits may be used or not used such as the divide by two circuits 49 and 102 in the respective circuit paths 12' and 14' to, in effect, provide outputs which may vary by a factor of two or more relative one to another and still have a phase settable relationship one to another. Phase setting, for example, could be for an output having two cycles for one of a reference frequency or, conversely, another example, having half a cycle for one cycle of the reference frequency output.

Whereas this invention is herein illustrated and described with respect to specific embodiments thereof, it should be realized that various changes may be made without departing from essential contributions to the art made by the teachings hereof.

We claim:

1. In a digital variable phase signal generator, a frequency input source; a reference signal circuit path terminating in a reference signal output terminal and connected at the input end to said frequency input source; a phase variable signal circuit path terminating in a phase variable signal output terminal and connected at the input end to said frequency input source; frequency dividing means in said reference signal circuit path; frequency dividing means in said phase variable signal circuit path; said frequency dividing means in said reference signal circuit path including multiple state output means; said frequency dividing means in said phase variable signal circuit path including multiple state setting means; switching means connected to said multiple state output means of the dividing means in the reference signal circuit, and to said multiple state setting means of the dividing means in said phase variable signal circuit path for selectively switching activating outputs of said multiple state output means to said multiple state setting means for controlled switch set phase shifting of the phase shiftable signal output relative to the reference signal output; and, wherein the frequency dividing means in said reference signal circuit path includes a plurality of flip-flop circuits having at least two output state terminals with one output state terminal of said flip-flop circuits connected in the through signal path of said reference signal circuit path and with two output terminals of said plurality of flip-flop circuits connected to said switching means as the switching means connection to said multiple state output means of the dividing means in the reference signal circuit; and said frequency dividing means in said phase variable signal circuit path includes a plurality of serially connected flip-flop circuits each having at least one output state terminal connected in the through signal path of said phase variable signal circuit path and at least one state setting terminal in the through signal path of said phase variable signal circuit path.

2. The digital variable phase signal generator of claim 1, wherein the frequency dividing means in said reference signal circuit path includes a plurality of flip-flop circuits having at least two output state terminals; and said frequency dividing means in said phase variable signal circuit path includes a plurality of flip-flop circuits having at least one output state terminal and at least one state setting terminal.

3. The digital variable phase signal generator of claim 1, wherein the flip-flop circuits in said phase variable signal circuit path include at least one flip-flop circuit with the state setting terminal being a set state circuit input connection from said switching means for the respective flip-flop; and at least one flip-flop circuit with the state setting terminal being a reset state circuit input connection from said switching means for the respective flip-flop.

4. The digital variable phase signal generator of claim 1, wherein a plurality of flip-flop circuits in said reference signal circuit path have at least one state setting terminal; and include at least one flip-flop circuit with the state setting terminals being a set state circuit input connection for the respective flip-flop; and at least one flip-flop circuit with the state setting terminal connection being a reset state circuit input connection for the respective flip-flop; and with circuit connective means between the reference signal circuit path and said state setting terminals of the flip-flop circuits in said reference signal circuit for reference signal circuit path signal activated recycling of flip-flops of that circuit.

5. The digital variable phase signal generator of claim 4, wherein a plurality of multiple flip-flop circuits are in said signal circuit path, with at least one of said multiple flip-flop circuits being a circuit wired for being recycled repeatedly through numerically fewer operational states, with repeated cycles of operation, than are inherently attainable with the number of flip-flop circuits in the respective multiple flip-flop circuit.

6. In a digital variable phase signal generator, a frequency input source; a reference signal circuit path terminating in a reference signal output terminal and connected at the input end to said frequency input source; a phase variable signal circuit path terminating in a phase variable signal output terminal and connected at the input end to said frequency input source; frequency dividing means in said reference signal circuit path; frequency dividing means in said phase variable signal circuit path; said frequency dividing means in said reference signal circuit path including multiple state output means; said frequency dividing means in said phase variable signal circuit path including multiple state setting means; switching means connected to said multiple state output means of the dividing means in the reference signal circuit, and to said multiple state setting means of the dividing means in said phase variable signal circuit path for selectively switching activating outputs of said multiple state output means to said multiple state setting means for controlled switch set phase shifting of the phase shiftable signal output relative to the reference signal output; and, wherein the dividing means in said reference signal circuit path and the dividing means in said phase variable signal circuit path are equal function divider chains and divide the frequency input signal down to equal frequency output signals.

References Cited

UNITED STATES PATENTS

| | | | |
|---|---|---|---|
| 2,731,634 | 1/1956 | Palmer | 328—39 X |
| 3,172,042 | 3/1965 | Dawirs | 328—48 |
| 3,229,203 | 1/1966 | Minohara | 324—83 |
| 3,374,359 | 3/1968 | Anderson | 328—39 X |

JOHN S. HEYMAN, Primary Examiner

STANLEY D. MILLER, Assistant Examiner

U.S. Cl. X.R.

307—220, 224, 262; 328—55, 155